United States Patent Office 2,708,172
Patented May 10, 1955

2,708,172

METHOD OF COATING CONCRETE ARTICLES WITH VITROUS COATINGS AND RESULTING ARTICLE

James T. Robson and Harvey C. Tucker, Cleveland Heights, Ohio, assignors to Ferro Corporation, Cleveland, Ohio, a corporation of Ohio No Drawing. Application January 15, 1954, Serial No. 404,401

9 Claims. (Cl. 117—70)

The present invention is a continuation-in-part of our application Serial Number 342,016 filed March 12, 1953.

This invention relates to a method of porcelain enameling and more particularly to the application of fritted glazes on concrete building blocks and the like.

In the enameling of non-metallic articles, the nature of the material from which the same are made introduces difficulties not encountered in the enameling of metallic work pieces. It is exceedingly more difficult to secure a continuous, non-porous and uniform enameled finish coat on a non-metallic article, which is many times rougher, full of pores and gas occlusions and subject to deterioration under influence of the high temperature necessary to fuse the porcelain enamel or fritted glaze, whereas in the porcelain enameling of a metallic article the object can be safely heated to the fusion temperature of the porcelain enamel and even higher without undergoing any substantial change.

Although many attempts have been made to apply a coating of fused fritted glaze to articles made of hydraulic cement and the like, until the present invention no satisfactory commercial method has been produced. Concrete building blocks and the like which have been coated with porcelain enamel or fritted glazes by prior art methods became so weakened and degenerated as to make them entirely unsatisfactory for the purposes for which they were intended. Such materials as concrete building blocks, concrete bricks, cement blocks, cinder blocks, concrete asbestos shingles and similar materials when subjected to prior art methods have resulted in finished articles with poor surfaces and of severely impaired mechanical strength.

It is, therefore, an object of our invention to provide a method of forming a fused porcelain enamel or fritted glaze coating upon articles made of hydraulic cement in such a manner that the mechanical strength of the article is not impaired.

Another object is to provide a method for the porcelain enameling of non-metallic objects by which a fused porcelain enamel finish coat may be secured which favorably compares with the type finish secured with metallic work pieces.

Other objects will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated the present invention comprises a structural building element having a body comprising aggregate material and hydraulic cement and a vitreous coating on a surface of said body, said coating comprising two separately fused, continuous non-porous layers, the inner layer comprising a fused mass of fritted glaze having a maturing temperature of between about 1000° F. and 1500° F. and the outer layer consisting essentially of fused fritted glaze having a maturing temperature of between about 1000° F. and 1500° F.

From the foregoing broad statement it will be seen that the concrete articles of the present invention have two separately fired coatings. The firing operations are such that the article is slowly heated and slowly cooled. This procedure is contrary to all existing prior art disclosures. First, in all prior art practices the concrete articles have only a singly fired coating. Secondly, in all prior art methods the work piece is heated rapidly in an attempt to heat only the outermost surface of the article so that no substantial portion of the body of the article is substantially raised in temperature.

In the following description of this invention the type of article to which the invention is applicable will first be described, followed in sequence by a description of the manner in which the article should be conditioned in carrying out the process of this invention; the type of coating which is believed suited in such process; and finally the actual steps employed and the conditions to be observed in such process.

The work body

As previously indicated, the present invention is useful in the application of layers of porcelain enamel or fritted glazes onto non-metallic bodies. This invention will be found to be particularly useful in the application of the above mentioned coatings on articles molded from hydraulic cement and aggregate. We may use concrete articles containing any of the well known aggregate materials such as expanded clay, shale (haydite), blast furnace slag, scoria, cinders, or the like.

The design of the work body is immaterial, solid block or the various cored blocks may be glazed satisfactorily when using the process of this invention.

While the present process is intended to include and is applicable to cement blocks, i. e., blocks made of hydraulic cement and sand without haydite or other large aggregate materials, in the preferred embodiment of our invention we use concrete blocks containing aggregate.

The coatings to be used

Since the concrete articles to be coated usually have extremely rough surfaces it is necessary to fill in the voids so as to present a relatively smooth surface for the finish coat. For the first or inner coat we have found that any of the well known fritted glazes which will mature at a temperature of from about 1000° F. to about 1500° F. when combined with from about 5% to about 70% of a refractory material are applicable to the present invention. The amount of refractory material used being dependent upon the condition of the surfaces to be coated and the mesh size of the refractory being used. In the preferred embodiment of our invention we use from about 20% to about 60% of the refractory material. As for the particle size of the refractory material, it can vary greatly. We prefer using refractory materials of the order of about 14 mesh to 100% through 60 mesh. Any of the well known refractory materials such as silica sand, zircon sand, titanium sand, alumina, mica, clay or the like may be admixed with the fritted glazes.

When the work piece coated with the first or inner coat is fired the refractory material fills in the voids on the surface of the piece and the fritted glaze fuses and flows over the surface and serves both to bind the refractory on the surface and also to furnish a smooth surface for the second or cover coat to adhere to. Thus an adhering non-shrinking filler is applied to the surface of the work piece.

By way of illustration, the following porcelain enamels suitable for the first or inner coat are given.

I

| | Per cent |
|---|---|
| Silica sand | 44.3 |
| Dehydrated borax | 37.3 |
| Calcium carbonate | 18.4 |

These ingredients are smelted and then fritted in water or air. This frit is then intimately admixed as by ball milling, with any of the previously mentioned refractory materials. The resultant admixed frit and refractory material is then applied to the work piece as by spraying, dipping, rolling or the like.

II

| | Per cent |
|---|---|
| Silica sand | 36.1 |
| Dehydrated borax | 30.4 |
| Litharge | 33.5 |

These ingredients are smelted, fritted and then intimately admixed with a refractory material as in Example I.

For the sake of clarity it will be reiterated here that the refractory materials concerned are mechanically admixed with the fritted glaze and are not to be confused with the raw batch ingredients which are subsequently smelted and fritted. While practically every known glaze contains a refractory material such as silica, once the glaze has been smelted the refractory as such no longer exists but is consumed in the formation of the chemical composition of which the glaze is composed.

The foregoing examples are merely given by way of illustration and should in no manner limit the invention. The glazes may be lead bearing or lead free frits. The only limiting factor to the frit used is that it must mature within a firing range of from about 1000° F. to about 1500° F. As previously stated the amount and particle size of the refractory material admixed with the frit is dependent upon the roughness of the surface to be coated.

The fritted glazes used in the second or cover coat may be those used in the first coat minus the refractory material. We prefer using cover coats which are capable of best withstanding the conditions under which the finished article will be used. When, for example, a structural element will be exposed to the weather, a porcelain enamel which is particularly weather resistant will be found preferable. An enamel which is weather resistant should be low in lead or lead free, it should be low in alkalies and high in silica or alumina. However, this second or cover coat must also conform to the firing range of from about 1000° F. to about 1500° F. As a specific example of such a porcelain enamel, the following is given.

III

| | Parts by weight |
|---|---|
| Silica sand | 48 |
| Dehydrated borax | 24 |
| Soda ash | 36 |
| Sodium nitrate | 7.5 |
| Fluorspar | 1.5 |
| Titania-silica mixture [1] | 36 |

[1] A mixture of one part $TiO_2$ and two parts $SiO_2$.

As previously stated the glazes of Examples I and II minus the refractory material are suited for cover coats. However, these cover coats would lend themselves more suitably where the structural element would be used on the inside and not subject to weathering conditions.

In the preferred embodiment of this invention the second or cover coat should normally be free of refractory materials other than small amounts of such extremely fine materials ordinarily employed for pigmentation or opacification. Thus the cover coat will be found to consist essentially of a fritted glaze and may or may not contain a small amount of pigmentation (on the order of about 1%–2%).

*Applying the coatings and firing the work*

Both of the coatings may be applied to the work in any conventional way as by spraying, brushing, roller coating or dusting. After the first coat is applied it is dried in any conventional drier and then fired in a regular ceramic kiln. After cooling the cover coat is applied, dried and fired in the same manner.

The work pieces are fired in a regular ceramic kiln with the burners on the side as in standard ceramic firing. The work pieces are preferably set back to back so as to give a gradual heat gradient throughout the pieces, consequently the pieces are not strained and do not crack as they are prone to do where the firing takes place at the top only as is the case in all prior art processes. Until the present invention, it has always been assumed that when firing concrete blocks the block gradient should be as great as possible, ranging on the back side from as close to room temperature as is physically possible to attain and then concentrating heat on the top or coated surface only. We have found that in order to maintain a stable block or a block in which the mechanical strength has not been impaired it is necessary to maintain the heat gradient of the article substantially at a minimum. We prefer to maintain the lowest temperature on the article at about 700° F. to 800° F. and the maximum temperature on the outside at about 1500° F. Secondly, to produce an article in which the mechanical strength has not been impaired it is necessary to slowly heat and slowly cool the articles during the firing cycle. We have found the preferred firing cycle to be from about 2 hours to about 8 hours with the maximum glaze fire being from about 20 to about 60 minutes. All other prior art processes have fired on the order of ½ to 2 minutes at temperatures over 2100° F., to keep heat penetration into the article as low as possible.

By slowly heating and slowly cooling in a firing range of about 1000° F. to 1500° F. we have been able to produce a concrete article of substantially no impaired mechanical strength with a uniformly fired glaze with uniform texture and color.

Tests conducted on concrete blocks coated according to the foregoing process show the compressive strength to be well above 1000 pounds per square inch and more uniform in strength than unglazed blocks. The bond between the glaze and the concrete is extremely good since blocks coated by the present process did not show spalling of the coatings when subjected to 15 inches of interior hydrostatic pressure for two months.

The glaze texture of the finished articles may be either glossy or matte and as previously stated may be colored with any of the available inorganic ceramic pigments.

Other modes of applying the principle of the invention may be employed, change being made as regards the details described, provided the features stated in any of the following claims or the equivalent of such be employed.

We therefore, particularly point out and distinctly claim as our invention:

1. A structural building element having a body comprising aggregate material and hydraulic cement and a vitreous coating on a surface of said body, said coating comprising two separately fused, continuous non-porous layers, the inner layer comprising a fused mass of fritted glaze having a maturing temperature of between about 1000° F. and 1500° F. including therein from about 5% to about 70% by weight of said glaze of discrete particles of a refractory material of appreciably higher melting point than said fritted glaze and the outer layer consisting essentially of fused fritted glaze having a maturing temperature of between about 1000° F. and 1500° F.

2. The product of claim 1 wherein said outer layer is colored by minor amounts of an inorganic pigment contained therein.

3. The method of coating a structural building element having a body of hydraulic cement and aggregate, which comprises applying a first coat to said article, said first coat comprising a fritted glaze having a maturing temperature of between about 1000° F. and 1500° F. including therein from about 5% to about 70% by weight of said glaze of discrete particles of a refractory material of appreciably higher melting point than said glaze, slowly heating said coated article until said first coat fuses onto said article wherein during the heating cycle the heat gradient of the article is maintained substantially at a minimum, allowing the coated article to slowly cool to substantially room temperature, then applying a second coat consisting essentially of a fritted glaze having a maturing temperature of between about 1000° F. and 1500° F., slowly heating said coated article until said second coat fuses onto said first coat wherein during the heating cycle the heat gradient of said article is maintained substantially at a minimum and finally allowing said coated article to slowly cool to substantially room temperature.

4. The method of coating a structural building element having a body of hydraulic cement and aggregate which comprises applying a first coat to said article, said first coat comprising a fritted glaze having a maturing temperature of between about 1000° F. and 1500° F. and having from about 5% to about 70% by weight of said glaze of discrete particles of a refractory material intimately admixed therewith, slowly heating said coated article until said first coat fuses onto said article wherein during the heating cycle the heat gradient of the article is maintained substantially at a minimum, allowing the coated article to slowly cool to substantially room temperature, said heating and cooling cycle comprising from about 2 to 8 hours, applying a second coat consisting essentially of a fritted glaze having a maturing temperature of between about 1000° F. and 1500° F., slowly heating said coated article until said second coat fuses onto said first coat wherein during the heating cycle the heat gradient of said article is maintained substantially at a minimum and finally allowing said coated article to slowly cool to substantially room temperature, said heating and cooling cycle comprising from about 2 to 8 hours.

5. The method of coating a structural building element which consists in forming an article having a body of hydraulic cement and aggregate, curing the article, applying a first coat of fritted glaze to said article, said glaze having a maturing temperature of between about 1000° and 1500° F. and having from about 5% to about 70% by weight of said glaze of discrete particles of a refractory material intimately admixed therewith, slowly heating said coated article until said first coat fuses onto said article wherein during the heating cycle the heat gradient of the article is maintained substantially at a minimum, holding the coated article at the maximum temperature for about 20 to 60 minutes, allowing the coated article to slowly cool to substantially room temperature, said heating and cooling cycle comprising from about 2 to 8 hours, applying a second coat consisting essentially of a fritted glaze, said glaze having a maturing temperature of between about 1000° F. and 1500° F., slowly heating said article until said second coat fuses onto said first coat wherein during the heating cycle the heat gradient of said article is maintained substantially at a minimum, holding the maximum temperature for about 20 to 60 minutes and finally allowing said article to slowly cool to substantially room temperature, said heating and cooling cycle comprising from 2 to 8 hours.

6. The method of claim 5 wherein said second coat is colored by minor amounts of an inorganic pigment contained therein.

7. The method of coating a structural building element having a body of hydraulic cement and aggregate which comprises applying a first coat to said article, said first coat comprising a fritted glaze which matures in a firing range of from about 1000° F. to about 1500° F. and having a refractory material intimately admixed therewith, slowly heating said coated article until said first coat fuses onto said article wherein during the heating cycle the heat gradient of the article is maintained substantially at a minimum, allowing the coated article to slowly cool to substantially room temperature, then applying a second coat consisting essentially of a fritted glaze which matures in a firing range of from about 1000° F. to about 1500° F. over said first coat, slowly heating said coated article until said second coat fuses onto said first coat wherein during the heating cycle the heat gradient of said article is maintained substantially at a minimum and finally allowing said coated article to slowly cool to substantially room temperature.

8. The method of coating a structural building element having a body of hydraulic cement and aggregate which comprises applying a first coat to said article, said first coat comprising a fritted glaze which matures in a firing range of about 1000° F. to about 1500° F. and having a refractory material intimately admixed therewith, slowly heating said coated article to a maximum temperature of from about 1000° F. to about 1500° F. wherein during the heating cycle the heat gradient of the article is maintained substantially at a minimum, allowing the coated article to slowly cool to substantially room temperature, said heating and cooling cycle comprising from about 2 to about 8 hours, applying a second coat consisting essentially of a fritted glaze, which matures in a firing range of from about 1000° F. to about 1500° F. wherein during the heating cycle the heat gradient of said article is maintained substantially at a minimum, and finally allowing the coated article to slowly cool to substantially room temperature, said heating and cooling cycle comprising from about 2 to about 8 hours.

9. The method of coating a structural building element which consists in forming an article having a body of hydraulic cement and aggregate, curing the article, applying a first coat of fritted glaze to said article, said glaze having a maturing temperature of from about 1000° F. to about 1500° F. and having a refractory material intimately admixed therewith, slowly heating said coated article to a maximum temperature of from about 1000° F. to about 1500° F. wherein during the heating cycle the heat gradient of the article is maintained substantially at a minimum, holding the coated article at the maximum temperature for about 20 to about 60 minutes, allowing the article to slowly cool to substantially room temperature, said heating and cooling cycle comprising from about 2 to about 8 hours, applying a second coat consisting essentially of a fritted glaze to said article, said glaze having a maturing temperature of from about 1000° to about 1500° F., and slowly heating said article to a maximum temperature of from about 1000° F. to about 1500° F. wherein during the heating cycle the heat gradient of said article is maintained substantially at a minimum, holding the maximum temperature for about 20 to about 60 minutes and finally allowing said article to slowly cool to substantially room temperature said heating and cooling cycle comprising from about 2 to about 8 hours.

References Cited in the file of this patent

UNITED STATES PATENTS

| | | |
|---|---|---|
| 1,900,833 | Maul | Mar. 7, 1933 |
| 2,562,477 | Ramsay | July 31, 1951 |